C. W. PARKER.
TRANSMISSION GEARING.
APPLICATION FILED FEB. 6, 1908.
968,189.
Patented Aug. 23, 1910.
2 SHEETS—SHEET 2.
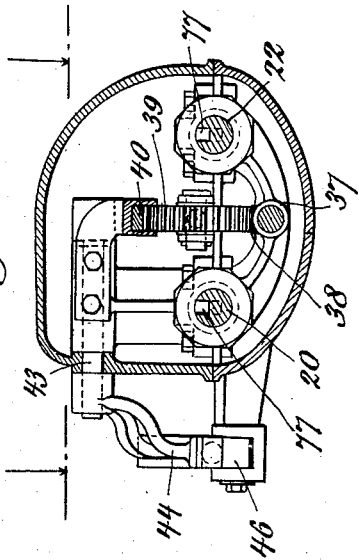
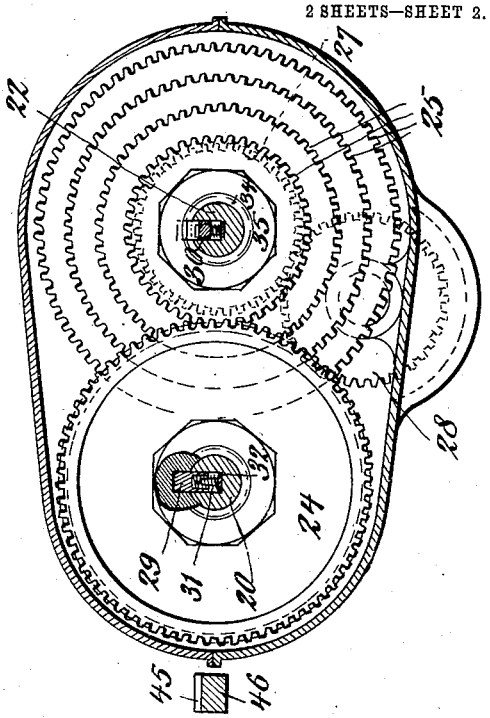

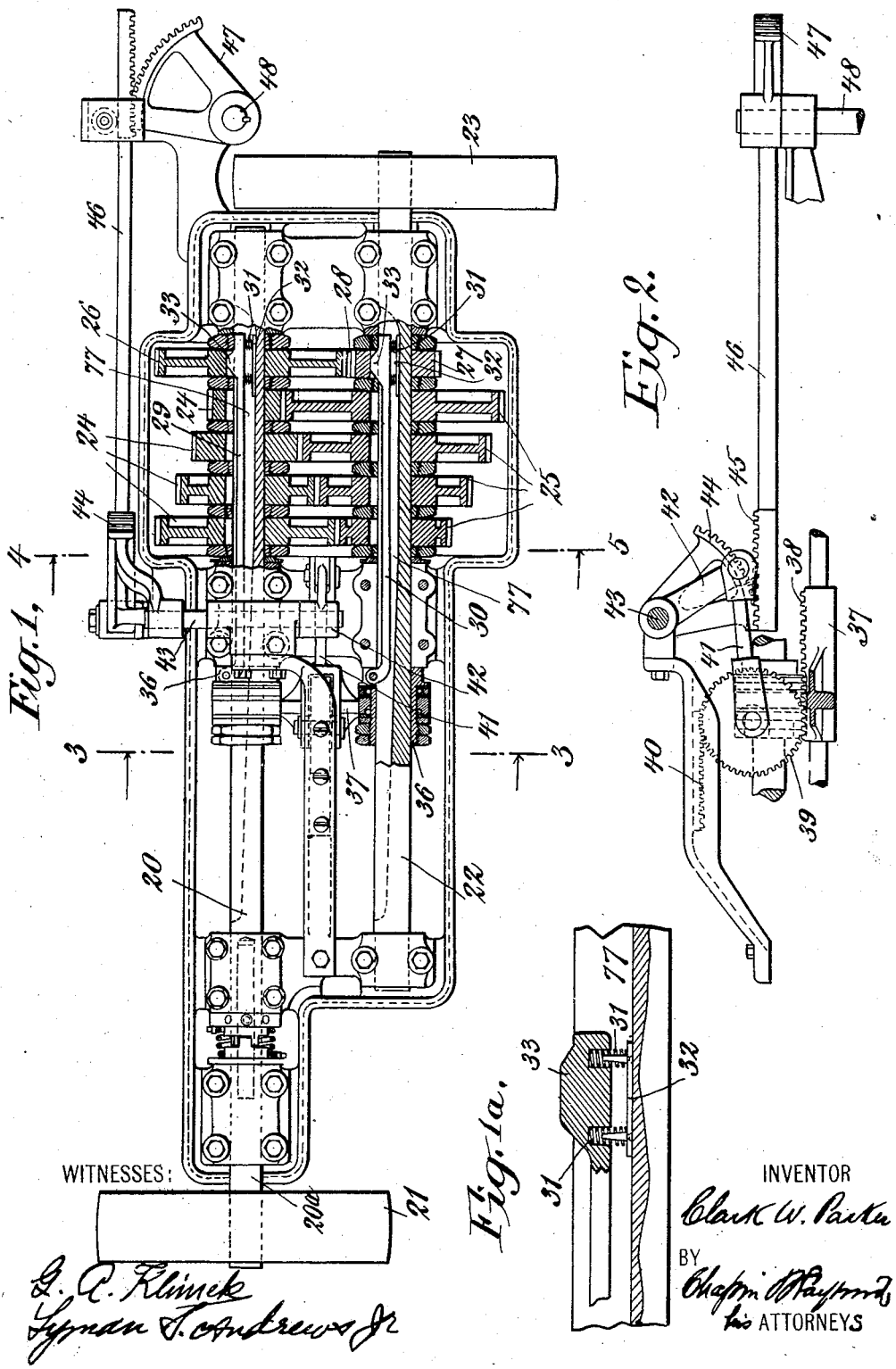

UNITED STATES PATENT OFFICE.

CLARK W. PARKER, OF SPRINGFIELD, MASSACHUSETTS, ASSIGNOR TO PARKER TRANSMISSION & APPLIANCE COMPANY, A CORPORATION OF MASSACHUSETTS.

TRANSMISSION-GEARING.

968,189.  Specification of Letters Patent.  Patented Aug. 23, 1910.

Application filed February 6, 1908. Serial No. 414,485.

*To all whom it may concern:*

Be it known that I, CLARK W. PARKER, a citizen of the United States of America, and a resident of Springfield, county of Hampden, and State of Massachusetts, have invented certain new and useful Improvements in Transmission-Gearing, of which the following is a specification, reference being had to the accompanying drawings, forming a part thereof.

My invention relates to improvements in transmission gearing, and particularly to transmission gearing involving change speed and reverse mechanism.

In order that my invention will be fully understood, I will describe an embodiment thereof, having reference to the accompanying drawings illustrating the same, and will then point out the novel features in claims.

In the drawings: Figure 1 is a view in central longitudinal section through a transmission gearing constituting an embodiment of my invention. Fig. 1ª is a detail view of a portion of one of the keys employed. Fig. 2 is a detail front view of certain parts of the operating mechanism. Fig. 3 is a transverse sectional view upon the line 3—3 of Fig. 1. Fig. 4 is a detail transverse sectional view upon the line 4—4 of Fig. 1.

The mechanism illustrated comprises a drive shaft 20 having a drive pulley 21 thereon; a driven shaft 22 having a pulley 23 thereon for transmitting driving movements, and a plurality of complementary gear wheels loosely mounted upon the said shafts. These gear wheels include a series of four progressively smaller gears 24 upon the driving shaft 20, a series of progressively larger gear wheels 25 upon the driven shaft arranged in intermeshing relation with the said gear wheels 24, a relatively large gear wheel 26 upon the driving shaft next to the smallest gear wheel 24 thereon, a relatively small gear wheel 27 upon the driven shaft next to the largest gear wheel 25 thereon, the said gear wheels 26 and 27 being arranged in line with each other but out of direct engagement, and an idler wheel 28 arranged in common mesh with the two gear wheels 26, 27, whereby they will be connected together in driving relation but whereby driving movements will be imparted from one shaft to the other in a direction opposite to that imparted through the intermeshing gear wheels 24—25.

The driving and driven shafts have each a longitudinal key-way 77 to which are fitted longitudinal keys 29—30 respectively. The said keys are each fitted to slide freely in a longitudinal direction in their respective key-ways and are each provided with a lateral projection or tooth 33 and with yielding means comprising springs 31 and a presser bar 32 arranged to travel therewith, the said springs and presser bar being preferably arranged at a point about opposite the tooth or projection 33, whereby the said tooth or projection is forced outward with a yielding pressure. The gear wheels 24, 25, 26 and 27 are each provided with a key-way or slot adapted to receive the tooth or projection 33 (see particularly Fig. 1 of the drawings), so that each said gear wheel is adapted to be connected in driving relation with its shaft by means of the key carried thereby. The gear wheels are spaced apart by spacing elements which are fitted to each shaft between the wheels thereon, such elements also constituting reinforcing means for the shafts so as to reinforce them along the portion which contains the key receiving slot.

The keys 29—30 are pivotally connected at their ends opposite to the ends having the teeth or projections 33 to traveling rings 36 surrounding the shafts 20—22 respectively, said rings being mounted upon a traveling carrier 37 to which longitudinal movements are adapted to be given for the purpose of longitudinally moving the said rings and keys carried thereby. These movements are transmitted to the carrier through rack teeth 38 thereon by means of a traveling gear wheel 39 which is arranged in mesh therewith and with a stationary rack 40, said pinion carried by a link 41 which is pivotally connected to an arm 42 upon a rock shaft 43, said rock shaft also carrying a quadrant 44, the teeth of which are arranged in mesh with the teeth 45 of a traveling rack bar 46. Movements are given to the rack bar 46 by means of a quadrant 47 which is mounted upon a vertical operating rock shaft 48, the teeth of the said quadrant 47 being arranged in mesh with rack teeth upon the said bar 46.

What I claim is:

1. Transmission gearing including a shaft having a longitudinal key-way therein, gear wheels loosely mounted upon the said shaft, a sliding key disposed within the said keyway and having a tooth or projection adapted to engage the said wheels, a presser bar also disposed within the said key-way and having studs which project into recesses in the said key, whereby the said presser bar is caused to travel longitudinally with the said key, springs surrounding the studs arranged to exert pressure between the said presser bar and the said key, and means for imparting longitudinal movements to the said key.

2. Transmission gearing including a shaft having a sliding key therein and elements loosely mounted upon the shaft with which the said key is adapted to engage, and operating means for imparting movements to the key comprising a loosely mounted traveling pinion, a carriage upon which the key is mounted, said carriage having rack teeth in mesh with the teeth of the said pinion, a stationary rack having teeth also in mesh with the teeth of said pinion, a rock shaft, an arm upon the rock shaft, a link connected at one end to the said arm and at the other end carrying the said pinion, a gear segment upon the said rock shaft, a traveling rack bar having teeth engaging the teeth of the gear segment, and means for imparting longitudinal movements to the said rack bar.

CLARK W. PARKER.

Witnesses:
CLINTON E. BELL,
IDA WESSLER.